3,159,613
PREPARATION OF CRYSTALLINE POLY(VINYL ALKYL ETHERS)
Edwin J. Vandenberg, Wilmington, Del., assignor to Hercules Powder Company, Wilmington, Del., a corporation of Delaware
No Drawing. Filed Dec. 27, 1960, Ser. No. 78,328
6 Claims. (Cl. 260—91.1)

This invention relates to a new process for the production of poly(vinyl ethers) of high molecular weight and high crystallinity.

It is well known that vinyl ethers may be polymerized in bulk or solution with Friedel Crafts catalysts to yield polymers that vary from viscous liquid to balsamlike or soft resinouslike polymers. Under certain conditions and using boron trifluoride etherates as catalysts it has been possible to produce a crystalline-type of poly(vinyl methyl ether) and poly(vinyl isobutyl ether), but in both cases the polymers have high solubilities. Thus, in the case of the crystalline-type poly(vinyl methyl ether) of the prior art the polymer is completely soluble in cold water and in organic solvents such as methanol, ethanol, acetone, and benzene. Accordingly, the utility of these prior art poly(vinyl ethers) has been considerably limited.

Now, in accordance with this invention it has been found that vinyl alkyl ethers can be polymerized to high molecular weight, crystalline polymers by using as the catalyst for the polymerization hydrogen fluoride or a fluoride which is readily hydrolyzed to give hydrogen fluoride in combination with a metal compound having the general formula:

$$R_xMR'_y$$

where M is a metal selected from Groups II-A, II-B, III-A, IV-A, IV-B, V-B, VI-B, and VIII of the Periodic Table (Lange, Handbook of Chemistry, 8th ed., pages 56–57, published 1952), R is a hydrocarbon radical, such as alkyl, alkenyl, cycloalkyl, cycloalkenyl, aryl, aralkyl, etc., R' is hydrogen, alkoxide, or an alkoxide derivative such as acetylacetonate, the sum of $x$ and $y$ is equal to $n$, the valence of the metal, $x$ can be 0 to $n$ and $y$ can be 0 to $n$ when R' is alkoxide and 0 to $n-1$ when R' is hydrogen. When R' is acetylacetonate a chelate may be formed. The polyethers so produced are high molecular weight, highly crystalline polymers that are capable of being formed into strong, orientable fibers and films.

Just what the catalyst species is when a vinyl ether is polymerized with one of the specified fluorides used in combination with one of the specified metal compounds is not known. Nonetheless, there is obtained a greatly improved result over that obtained when the metal compound is omitted.

Any metal compound of the above-specified metals that has the above formula can be combined with a fluoride to produce the catalyst used in accordance with the invention. Exemplary of these metal compounds are organometallic compounds wherein there are attached to the metal only hydrogen or hydrocarbon radicals, as, for example, magnesium or zinc dihydrocarbons, aluminum trihydrocarbons, aluminum dihydrocarbon hydrides, etc., the corresponding gallium and indium compounds, tin tetraalkyls, etc. Another group of metal compounds are the metal alkoxides and their derivatives, as, for example, aluminum methoxide, ethoxide, propoxide, isopropoxide, butoxide, etc.; aluminum acetylacetonate; titanium alkoxides, vanadium alkoxides, ferric alkoxides, zirconium alkoxides, etc.; and the mixed alkyl metal alkoxides, as, for example, ethyl aluminum diisopropoxide, diethyl aluminum monoethoxide, diethyl aluminum acetylacetonate, ethyl aluminum di-n-octoxide, etc.

As stated above, the fluoride used is either hydrogen fluoride or a fluoride which is readily hydrolyzed to give hydrogen fluoride. In addition to hydrogen fluoride the fluorides, including oxy fluorides, of the elements of Groups III-A, IV-A, V-A, and VI-A of the Periodic Table can be used. Exemplary of these fluorides are aluminum fluoride, boron trifluoride, silicon tetrafluoride, stannic fluoride, phosphorus trifluoride, phosphorus oxyfluoride, phosphorus pentafluoride, sulfur monofluoride, sulfur tetrafluoride, thionyl fluoride, etc.

The fluoride and the metal compound can be premixed and used in the polymerization reaction or they can be mixed in situ. Preferably they are mixed in an inert, anhydrous, liquid, organic diluent at a temperature of from about −100° C. to about 150° C., more preferably from about −80° C. to about 100° C., and then used as such alone or with an additional amount of the metal compound for the polymerization. For example, excellent results have been obtained when a small quantity of metal alkoxide is first added to the vinyl ether to be polymerized whereby any traces of impurities such as water, acid, etc., are removed, and then the premixed catalyst combination is added. In some cases it is advantageous to age the catalyst combination either at the mixing temperature or at a higher temperature. Whether the catalyst combination should be aged, and under what conditions, will, of course, depend upon the specific combination being used.

The amount of the catalyst combination used for the polymerization of the vinyl ethers can vary from a minor catalytic amount to a large excess, but generally will be an amount such that the amount of fluoride used in the catalyst mixture will be within the range of from about 0.001 mole of catalyst per mole of monomer to about 0.05 mole of catalyst per mole of monomer. The mole ratio of the fluoride compound to the metal compound can also be varied over a wide range, but preferably will be from about 0.01:1 to about 10:1. In the case of the boron trifluoride and of hydrogen fluoride, this ratio will preferably be from about 0.01:1 to about 2:1.

Any vinyl alkyl ether can be polymerized or copolymerized with the above-described catalyst combination in accordance with this invention, as, for example, vinyl methyl ether, propenyl methyl ether, vinyl ethyl ether, propenyl ethyl ether, vinyl propyl ether, propenyl propyl ether, vinyl isopropyl ether, vinyl n-butyl ether, vinyl isobutyl ether, vinyl tert.-butyl ether, vinyl neopentyl ether, vinyl 2-chloroethyl ether, vinyl 2-methoxyethyl ether, vinyl trifluoroethyl ether, 1-methoxybutadiene, etc.

The polymerization can be carried out with or without a diluent, but for ease of operation, separation of the catalyst from the polymer, etc., it is generally carried out in an inert diluent. Any anhydrous liquid, organic diluent that is inert under the reaction conditions can be used, as, for example, aliphatic, cycloaliphatic, or aromatic hydrocarbons, chlorinated hydrocarbons, ethers, esters, etc. Exemplary of such diluents are hexane, heptane, cyclohexane, benzene, toluene, xylene, etc., or a mixture of such hydrocarbons, methylene chloride, chloroform, carbon tetrachloride, ethylene dichloride, chlorobenzene, diethyl ether, diisopropyl ether, ethyl acetate, etc.

The selection of the temperature and pressure used for the polymerization process will depend upon the activity of the specific catalyst being used, the diluent used, etc. In general, the polymerization will be carried out at a temperature within the range of from about −100° C. to about 200° C., and preferably from about −80° C. to about 100° C. In the same way, while atmospheric pressure or a pressure of only a few pounds can be used, the polymerization can be carried out under a wide range of pressure, as, for example, from a partial vacuum to about 1000 pounds, and preferably from about atmospheric to about 500 pounds pressure. Higher pressures can, of course, be used, but generally do not appreciably alter the course of the polymerization.

When the polymerization is carried out as described above, the polymer is readily isolated from the solution or slurry of polymer and diluent by simply removing the diluent by evaporation, filtration, or other such means. The polymer can then be purified to remove the catalyst residues by washing with an alcoholic or aqueous solution of acid or base or by dissolving the polymer in a suitable solvent, filtering to remove the insoluble catalyst and then separating the polymer from the so-purified solution. Frequently it is desirable to add a stabilizer such as 4,4'-thiobis(6-tert.-butyl-m-cresol), di-tert.-butyl-p-cresol, etc., to protect the polymer during storage or during use under adverse conditions.

In many cases the polymers produced in accordance with this invention are mixtures of highly crystalline polymers with amorphous or slightly crystalline polymers. In order to obtain a high solvent resistance and high tensile strength it is generally advisable to remove any amorphous polymer which is present. Sometimes it is also advisable to remove slightly crystalline polymer. This is readily done by washing the polymer with a solvent which dissolves the slightly crystalline and amorphous product, but which does not dissolve the highly crystalline product.

The following examples will illustrate the process of polymerizing vinyl ethers in accordance with this invention to high molecular weight, highly crystalline polymers. The molecular weight of the polymers produced in these examples is indicated by the Reduced Specific Viscosity (RSV) given for each. By the term "Reduced Specific Viscosity" is meant the $\eta sp/C$ determined on an 0.1% solution (0.1 g. of the polymer per 100 ml. of solution) of the polymer in chloroform at 25° C. All parts and percentages are by weight unless otherwise indicated.

EXAMPLES 1–4

In each of these examples the catalyst used was prepared by mixing the fluoride compound with the metal compound prior to use in the polymerization system. In Examples 1 and 2 a solution of boron trifluoride etherate in a 50:50 ether-heptane diluent was mixed with a solution of the metal compound, and the mixture was shaken for one hour with glass beads at room temperature prior to use. In Examples 3 and 4 anhydrous liquid hydrogen fluoride was added to a solution of the metal compound in n-heptane, and the mixture was shaken at room temperature with glass beads for one hour in Example 3 prior to use, and in Example 4 for two hours, and then was allowed to stand at room temperature overnight prior to use.

The polymerization was carried out in each case by charging a polymerization vessel filled with nitrogen with 10 parts of vinyl methyl ether, 50 to 65 parts of methylene chloride in Examples 1–3 and 7 parts of n-heptane in Example 4, and a specified amount of metal alkoxide as activator. After equilibrating the vessel and contents at the reaction temperature, the catalyst mixure prepared as described above was added. The reaction mixture was then agitated at the reaction temperature for the specified time, after which the catalyst was destroyed by adding 2 parts of a 1 M solution of ammonia in ethanol. To the reaction mixture was then added two parts of a 1% solution of 4,4'-thiobis(6-tert-butyl-m-cresol) in ethanol as a stabilizer, and the diluents were removed under vacuum. The crude polymer was extracted several times with methanol to separate the methanol-insoluble, highly crystalline polymer from the methanol-soluble, amorphous or slightly crystalline polymer.

In Table 1 is set forth the fluoride compound and the metal alkoxide used to prepare the catalyst in each example and the amount of each, the amount of activator added to the vinyl methyl ether before addition of the premixed catalyst, the reaction time and temperature, and the RSV of the highly crystalline polymer produced, along with the percent of the total polymer that was highly crystalline.

Table 1

| Example | Premixed Catalyst Combination ||||| Additional Metal Alkoxide Added to Monomer | Parts | Reaction Time and Temperature | Crystalline Polymer Isolated ||
|---|---|---|---|---|---|---|---|---|---|---|
| | Fluoride Compound | Parts | Metal Alkoxide | Parts | Molar Ratio F to M [2] | | | | RSV | Percent of Total |
| 1 | BF$_3$ | 0.010 | Ti(O-iC$_3$H$_7$)$_4$ | 0.013 | 1:0.3 | Ti(O-iC$_3$H$_7$)$_4$ | 0.028 | 0° C.— 2 Hrs. / 25° C.—16 Hrs. | 2.19 | 12 |
| 2 | BF$_3$ | 0.015 | Al(O-iC$_3$H$_7$)$_3$ | 0.047 | 1:1 | Al(O-iC$_3$H$_7$)$_3$ | 0.208 | 0° C.— 2 Hrs. / 25° C.—16 Hrs. | 2.73 | 37 |
| 3 | HF | [1] 0.006 | Al(O-iC$_3$H$_7$)$_3$ | 0.17 | 1:2.8 | Al(O-iC$_3$H$_7$)$_3$ | 0.225 | 0° C.— 3 Hrs. / 25° C.—16 Hrs. | 4.4 | 70 |
| 4 | HF | 0.043 | Ti(O-iC$_3$H$_7$)$_4$ | 0.92 | 1:1.5 | Ti(O-iC$_3$H$_7$)$_4$ | 0.28 | 0° C.— 2 Hrs. / 25° C.—16 Hrs. | 7.6 | 43 |

[1] Added in two equal portions—one at beginning and a second one hour later.
[2] Molar ratio of fluoride compound to metal compound.

EXAMPLE 5

The catalyst used in this example was prepared by mixing 0.08 part of hydrogen fluoride with 0.2 part of triisobutyl aluminum in 0.6 part of n-heptane and aging for several weeks at room temperature.

A polymerization vessel was filled with nitrogen and then charged with 10.2 parts of vinyl methyl ether, 17.0 parts of diethyl ether, and 0.4 part of triisobutyl aluminum in 1 part of n-heptane. Then the above-described premixed catalyst was added and the reaction agitated at 30° C. for 68 hours. At the end of this time the reaction was distilled under vacuum to remove any unreacted monomer and the catalyst destroyed by adding 4 parts of a 1 M solution of ammonia in ethanol. The catalyst was removed by extraction with 4 parts of 10% methanolic HCl. The polymer was then washed several times with anhydrous ethanol, once with 0.1% sodium hydroxide in methanol, once with methanol, and once with an 0.05% solution of 4,4'-thiobis(6-tert.-butyl-m-cresol) in methanol. The methanol-insoluble polymer was then dried for 16 hours at a temperature of 50° C. under vacuum. The resulting crystalline poly(vinyl methyl ether) had an RSV of 16.

EXAMPLE 6

The catalyst used in this example was prepared by injecting 14.3 parts of 0.5 M diethyl magnesium in diethyl ether into a 500 ml. reaction vessel filled with gaseous hydrogen fluoride. The vigorousness of the ensuing reaction required the venting of the reaction vessel. After the reaction subsided the vessel was pressured with nitrogen and agitated for one hour. An amount of diethyl ether sufficient to restore the initial volume of diethyl ether was added and the catalyst aged for 20 hours at room temperature. Analysis showed the molar ratio of fluorine to magnesium to be 0.57:1.

A polymerization vessel was filled with nitrogen and charged with 2.5 parts of vinyl methyl ether and 7.3 parts of n-heptane. Then a 1.4 part aliquot of the above-described premixed catalyst was added and the reaction agitated at 30° C. for 43 hours. The crystalline polymer was extracted from the resulting slurry as described in Example 5. The resulting crystalline poly(vinyl methyl ether) amounted to a 21% conversion and had an RSV of 0.8.

What I claim and desire to protect by Letters Patent is:

1. The process of polymerizing vinyl alkyl ethers which comprises contacting at least one of said ethers with a catalyst formed by contacting hydrogen fluoride with a metal compound having the formula $$R_xMR'_y$$

where M is a metal selected from the group consisting of titanium, aluminum, magnesium, zinc, gallium, indium, tin, vanadium, iron, and zirconium, R is an alkyl hydrocarbon radical, R' is a radical selected from the group consisting of hydrogen and alkoxide radicals, the sum of $x$ and $y$ is equal to $n$, the valence of said metal, $x$ is zero to $n$, and $y$ is zero to $n$ when R' is an alkoxide and zero to $n-1$ when R' is hydrogen.

2. The process of claim 1 wherein the vinyl alkyl ether is vinyl methyl ether.

3. The process of claim 2 wherein the catalyst is that formed by mixing hydrogen fluoride with an aluminum alkoxide.

4. The process of claim 2 wherein the catalyst is that formed by mixing hydrogen fluoride with a titanium alkoxide.

5. The process of claim 2 wherein the catalyst is that formed by mixing hydrogen fluoride with a trialkyl aluminum.

6. The process of claim 2 wherein the catalyst is that formed by mixing hydrogen fluoride with a dialkyl magnesium.

References Cited in the file of this patent
UNITED STATES PATENTS

| | | |
|---|---|---|
| 2,616,879 | Zoss | Nov. 4, 1952 |
| 2,832,759 | Nowlin et al. | Apr. 29, 1958 |
| 2,935,500 | Nowlin et al. | May 3, 1960 |
| 2,956,993 | Nowlin et al. | Oct. 18, 1960 |
| 3,023,198 | Nowlin et al. | Feb. 27, 1962 |
| 3,066,123 | Strokmeyer et al. | Nov. 27, 1962 |

FOREIGN PATENTS

| | | |
|---|---|---|
| 571,741 | Italy | Apr. 15, 1958 |

OTHER REFERENCES

Topchiev et al., CA46: 2477a (1952).